United States Patent [19]

Takematsu

[11] 4,337,416
[45] * Jun. 29, 1982

[54] ELECTRIC FLASH APPARATUS

[75] Inventor: Yoshiyuki Takematsu, Tokyo, Japan

[73] Assignee: Fuji Koeki Corporation, Tokyo, Japan; a part interest

[*] Notice: The portion of the term of this patent subsequent to Dec. 30, 1997, has been disclaimed.

[21] Appl. No.: 140,880

[22] Filed: Apr. 16, 1980

[30] Foreign Application Priority Data

Apr. 17, 1979 [JP] Japan .............................. 54-046964
Apr. 17, 1979 [JP] Japan .............................. 54-046965

[51] Int. Cl.$^3$ ........................................... H05B 41/32
[52] U.S. Cl. ............................... 315/241 P; 315/151; 315/152; 315/324
[58] Field of Search ............. 315/151, 152, 159, 241 P, 315/312, 313, 324; 354/33–35, 132, 135; 362/11, 12

[56] References Cited

U.S. PATENT DOCUMENTS

| | | | |
|---|---|---|---|
| 2,351,603 | 6/1944 | Edgerton | 315/241 P |
| 2,894,174 | 7/1959 | Schankler | 315/173 X |
| 3,113,495 | 10/1963 | Brandt et al. | 354/132 |
| 3,878,429 | 4/1975 | Iwata | 315/151 |
| 3,919,594 | 11/1975 | Mahlich et al. | 315/241 P |
| 4,068,245 | 1/1978 | Ohtaki et al. | 354/33 X |
| 4,078,240 | 3/1978 | Kaneko et al. | 315/241 P X |

Primary Examiner—Eugene R. La Roche
Attorney, Agent, or Firm—Fleit & Jacobson

[57] ABSTRACT

An electric flash apparatus of the present invention comprises a first flashing member having at least one first flash tube, a second flashing member having at least one second flash tube and a flash control arrangement for controlling flashing of said flashing members. The flash control arrangement includes a rectifying circuit, an electric charge storing circuit and a flash tube circuit member. The electric charge storing circuit is provided a first main storage capacitor for supplying the electric energy to the first flash tube and a second main storage capacitor for supplying the electric energy to the second flash tube. The flash tube circuit member is provided with a flash light control means for adjusting quantity of the first and the second flash tubes and a flash timing control means for controlling the flash durations of said flash tubes in order to facilitate the good flashing performance.

25 Claims, 8 Drawing Figures

ELECTRIC FLASH APPARATUS

BACKGROUND OF THE INVENTION

The present invention relates to electric flash apparatus and, more particularly, to electric flash apparatus for use of optical apparatus such as a photographic device.

In recent years, flash apparatus has been widely employed in various kind of optical apparatus requiring flashlight. Particularly, in the art of photography, artificial light is commonly used to illuminate an object to be photographed. One form of artificial light which is now widely used is that produced by the so-called electric flash device. In such devices, a flash tube is provided in order to illuminate the object to be photographed, but the arrangement is such that the light from the flash tube will illuminate only the object; if the surface of the object is contoured the illumination of the surface is uneven. Furthermore, when the flashlight from the photoflash is employed as direct illumination for the photographic object in a room or a photostudio, a shadow of the photographic object is commonly formed behind producing poor photographic results.

In order to alleviate these disadvantages of photoflash devices, it is known to use reflected, or bounced light to illuminate the object. In taking a picture by means of bounced light, there are still problems however, in that the quantity of light incident on the photographic object is much reduced from the predetermined value to which the device is set, particularly when a reflecting surface such as a ceiling surface is not white, and in that an object having an uneven surface cannot be photographed so well, because a significant portion of the light reflected from the object is not incident on the film in the camera.

To alleviate these disadvantages expensive illuminating equipment is required such as a front light, an umbrella-shaped reflecting plate and a backlight for eliminating the shadow from the background of the photographic object. This equipment, as well as being expensive is also bulky.

SUMMARY OF THE INVENTION

An object of the invention is to provide an electric flash apparatus which performs good flashing operations.

Further object of the invention is to provide an electric flash apparatus which is reliable and which is inexpensive and economical.

Other objects and features will be in part apparent and in part pointed out hereinafter.

According to the present invention, an electric flash apparatus comprises a first flashing member including at least one first flash tube, a second flashing member at least one second flash tube, and a flash control arrangement having means for stopping a flashing when resultant flash light quantity attains a predetermined value, said flash control arrangement includes an electric charge storing circuit comprising a first main storage capacitor for supplying an electrical energy and a second main storage capacitor for supplying an electrical energy to said second flash tube, triggering means for triggering said flash tubes, and said flash tube circuit member comprising a flash timing control means for controlling flash timing such that flashlight durations of said first flash tubes become same and approximately same.

BRIEF DESCRIPTION OF THE DRAWINGS

An embodiment of the invention will now be described by way of examples with reference to the accompanying drawings, in which.

DESCRIPTION OF THE PREFERRED EMBODIMENTS

Figure 1:
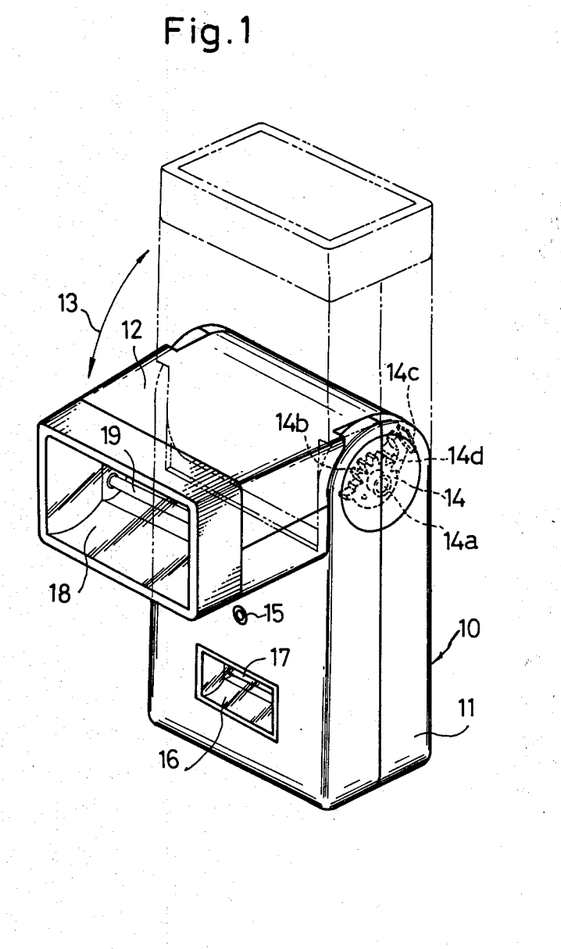
FIG. 1 is a perspective view of an electric flash device according to the present invention.
Figure 2:
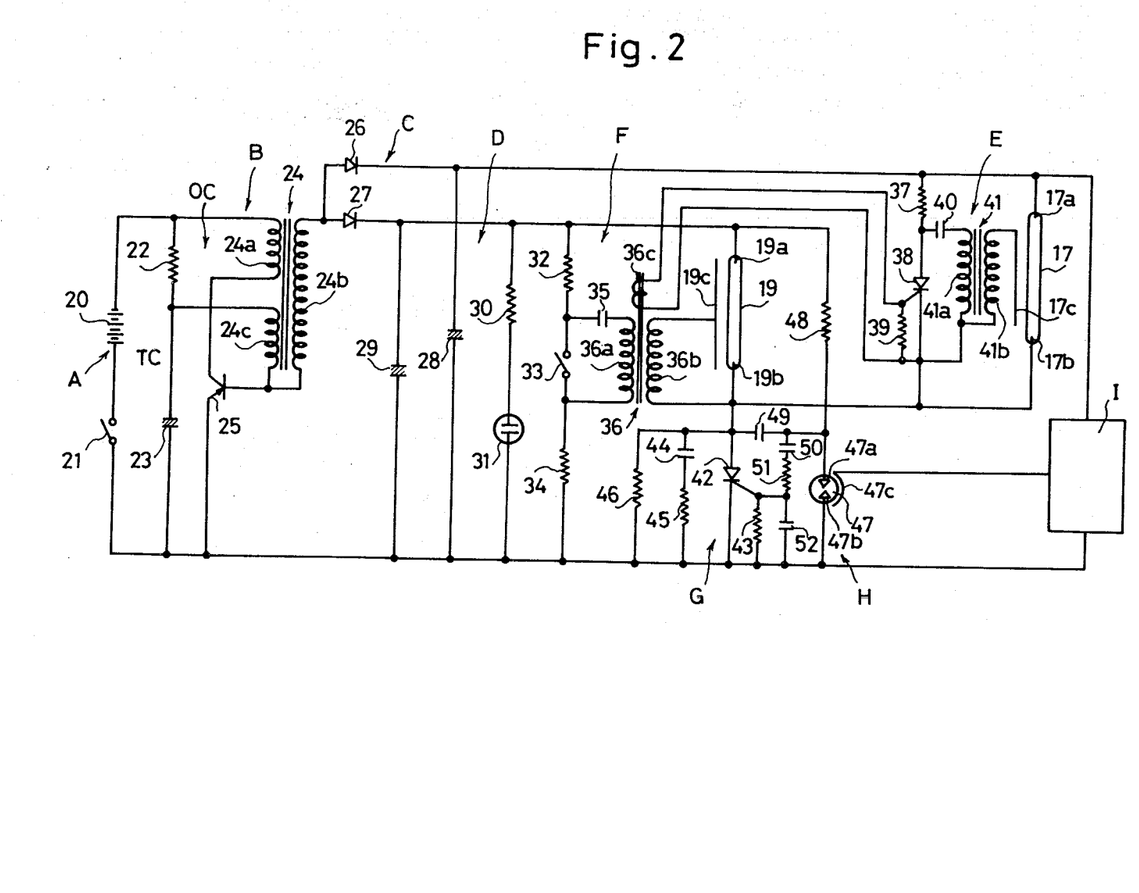
FIG. 2 is a detailed circuit diagram of a control circuit arrangement of an electric flash device according to the present invention.

With reference to FIG. 1 of the drawings, there is shown, greatly simplified, an electric flash device according to the present invention. The electric flash device has a flash housing, generally designated by numeral 10 and consisting of a first casing 11 and a second casing 12. The second casing 12 is pivotably connected to the first casing 11 by means of a pivotable connecting member 14. The connecting member 14 forms part of a ratch mechanism and includes a pin 14a which is fixed on the second casing 12 and which is pivotably engaged with the first casing 11. The ratch mechanism includes a ratch gear 14b which is fastened to the second casing 12 together with the pin 14a, a curved U-shaped plate spring 14c carried in the first casing 11 and a pawl segment 14d which is provided between the plate spring 14c and the ratch gear 14a. Accordingly, the second casing 12 is rotatable as is shown in by an arrow 13 with respect to the first casing 11. The first casing 11 is equipped with a light sensitive element 15 and, recessed in a front surface thereof, a first flash member 16 which includes a first flash tube 17. The second casing 12 is equipped with a second flash member 18 which includes a second flash tube 19. Accommodated in the housing 10 is a flash control circuit arrangement which is constructed as shown in FIG. 2.

The flash control circuit arrangement comprises a direct current power source circuit A, a voltage converter circuit B for converting and boosting a direct current voltage from the direct current power source circuit A to an alternating current voltage, a rectifier circuit C for rectifying the alternating current voltage from the voltage converter circuit B, an electric charge storing circuit D for supplying the electrical energy to the flash tubes 17 and 19, a trigger pulse generating means for triggering a flash tube circuit member, a switching circuit G for actuating the flash tube circuit member, a quenching circuit H for extinguishing the flash tube circuit member and a quenching trigger signal generating circuit I for actuating the quenching circuit H. The flash tube circuit member consists of the first flash tube 17 and the second flash tube 19. The trigger pulse generating means consists of a first trigger pulse generating circuit E for triggering the first flash tube 17 and a second trigger pulse generating circuit F for triggering the second flash tube 19.

In more detail, the power source circuit A includes a battery 20 and a manually operated switch 21 connected in series with the battery 20. The voltage converter circuit B comprises, substantially, an oscillator circuit OC and an oscillation time constant circuit TC. In more detail, the voltage converter circuit B includes a resistor 22 of which one terminal is directly connected to the negative terminal of the battery 20, a capacitor 23 of which one terminal is connected to other terminal of the resistor 22 to form the oscillation time constant circuit TC, an oscillating transformer 24, an oscillation switching element in the form of a transistor 25. The oscillating transformer 24 consists of a primary winding 24a, a secondary winding 24b and a third winding 24c. One terminal of the primary winding 24a is directly connected to the negative terminal of the battery 20, and other terminal of the primary winding 24a is connected to a collector electrode of the transistor 25 in order to form the oscillator circuit OC. One terminal of the secondary winding 24b is connected a base electrode of the transistor 25. The rectifier circuit C comprises a first electric valve in the form of a first diode 26 of which anode electrode is connected to a terminal of the secondary winding 24b of the oscillating transformer 24 and a second electric valve in the form of a second diode 27 of which positive electrode is connected to the secondary winding 24b. The electric charge storing circuit D comprises a first main storage capacitor 28, a second main storage capacitor 29 and an indicating lamp 31 for indicating the charging. The first main storage capacitor 28 is connected to a cathode electrode of the first diode 26. The second main storage capacitor 29 is connected to a cathode electrode of the second diode 27.

The second trigger pulse generating circuit F includes a trigger resistor 32, a synchronizing switch 33, a resistor 34, a trigger capacitor 35 and a trigger transformer 36. In the second trigger pulse generating circuit F, one terminal of the trigger resistor 32 is connected to a cathode electrode of the second diode 27. One terminal of the trigger capacitor 35 is connected to the other terminal of the resistor 32 and an input winding 36a of the trigger transformer 36 is connected to the other terminal of the trigger capacitor 35. The trigger transformer 36 comprises the input winding 36a, an output winding 36b and a detection winding 36c.

The first trigger pulse generating circuit E includes a trigger resistor 37, a switching element in the form of a first thyristor 38, a gate resistor 39, a trigger capacitor 40 and a trigger transformer 41. In the first trigger pulse generating circuit E one terminal of the trigger resistor 37 is connected to a negative terminal of the first diode 26. One terminal of the trigger capacitor 40 is connected to the other terminal of the resistor 37, and an input winding 41a of the trigger transformer 41 is connected to the other terminal of the trigger capacitor 40. The first thyristor 38 is connected to the input winding 41a in parallel relationship by way of the trigger capacitor 40. A gate electrode and a cathode electrode of the first thyristor 38 are connected to the detection winding 36c of the trigger transformer 36.

The switching circuit G includes a switching element in the form of a second thyristor 42, a gate resistor 43, a capacitor 44 and resistors 45 and 46. The second thyristor 42 is connected in series with the first flash tube 17 and the second flash tube 19 of the flash tube circuit member. The capacitor 44 is connected between an anode electrode and a cathode electrode across the resistor 45.

The flash tube circuit member comprises a first flash tube 17, a second flash tube 19. The first flash tube 17 is provided with a pair of main current conducting electrodes 17a, 17b and a trigger electrode 17c which is also positioned adjacent but external to the flash tube 17. The second flash tube 19 is also provided with main current conducting electrodes 19a, 19b and a trigger electrode 19c which is also positioned adjacent but external to the flash tube 19. As explained in the foregoing in FIG. 1, the first flash tube 17 is arranged in the first flash member 16 which is recessed in a front surface of the first casing 11, and the second flash tube 19 is arranged in the second flash member 18 mounted on an end portion of the second casing 12. One main current conducting electrode 17a of the first flash tube 17 is connected to one electrode of the first main storage capacitor 28, and other main current conducting electrode 17b is connected to the anode electrode of the second thyristor 42 of the switching circuit G. The trigger electrode 17c of the first flash tube 17 is connected one terminal of an output winding 41b of trigger transformer 41. One main current conducting electrode 19a of the second flash tube 19 is connected to the one electrode of the second main storage capacitor 27, and the other main current conducting electrode 19b is connected to the anode of the second thyristor 42 together with the main current conducting electrode 17b of the first flash tube 17 and, therefore, electrodes 17b and 19b are connected to other electrodes of the main storage capacitors 28 and 29 by way of the second thyristor 42.

There are certain criteria, in the flash tube circuit member, that must be met in both flash tubes 17 and 19. To operate effectively, the current to be supplied to the first flash tube 17 must be relatively small compared with that to be supplied to the second flash tube 19, in order to make the quantity of the flash light generated by the first flash tube 17 to be smaller than that of the flash light from the second flash tube 19. To ensure this the first flash tube 17 must have a relatively low impedance compared with the second flash tube 19. To provide such low impedance, the first flash tube 17 should have a low gas pressure and a small electrode spacing, in comparison with the second flash tube 19. That is to say, length and diameter of the second flash tube 19 is set to be larger than that of the first flash tube 17 such that the light quantity of the second flash tube 19 becomes greater than that of the first flash tube 17. Capacity of the second main storage capacitor 29 is set to be larger than that of the first main storage capacitor 28, since the light quantity of the second flash tube 19 is greater than that of the first flash tube 17. Moreover, an internal resistance value of the first flash tube 17 is adjusted and set to be large in comparison with a conventional flash tube in order to make the flash durations of the first and the second flash tubes 17 and 19 same or approximately same, because the flash light duration becomes long in case the internal resistance value is large. In this case, the term of approximately same includes meaning of an optical approximate value. Accordingly, it is unnecessary to provide an impedance element between the first diode 26 and the first flash tube 17, and the power loss due to the impedance element is avoided.

The quenching circuit H includes a quench tube 47 for quenching the flash tubes 17 and 19, a resistor 48, a commutation capacitor 49 and a resistor 51 and capacitors 50 and 52. The quench tube 47 is connected to both electrodes of the second main storage capacitor 29 through the resistor 48. The commutation capacitor 49 is connected between a junction of the resistor 48 and the quench tube 47 and the anode electrode of the thyristor 42. A series circuit consisting of the resistor 51 and the capacitors 51 and 52 is connected to the quench tube 47 in parallel relationship.

There are, of course, certain criteria that must be met in quench tube 47. To operate effectively, the quench tube 38 must have a low impedance compared with the first flash tube 17 and the second flash tube 19. The second flash tube 19 has a minimum impedance of typically 1.5 to 2 ohms. Thus, the quench tube 47 should have an impedance near 0.1 ohm. To provide such low impedance, the quench tube 47 also should have a low gas pressure and a small electrode spacing. The electrodes 47a and 47b must be capable of carrying a very high current for short time. The tube 47 must be capable of being triggered rapidly and easily into conduction over the range of voltage change across the flash tubes 17 and 19 during the flash. The quench tube 47 includes a trigger electrode 47c spaced midway between the two main electrodes 47a and 47b.

The quench trigger signal generating circuit I is provided with light sensing means for sensing the flash lights from the first and the second flash tubes 17 and 19 and flash light time duration adjusting means for adjusting maximum continuing time duration of the flash lights produced the first and the second flash tubes 17 and 19.

A circuit constructed in accordance with the foregoing description operates as follows.

When the power source switch 21 is closed, the voltage converter circuit B activates an oscillating operation, and thereby the high voltage is induced at the secondary winding 24b of the transformer 24. The boosted alternating current voltage is rectified by the rectifier circuit C, and thereafter electric charge is stored on the first main storage capacitor 28 and the second main storage capacitor 29. When the main storage capacitors 28 and 29 are fully charged up to the predetermined and suitable voltage, the neon glow lamp 31 lights indicating that the device is readiness for the flash tubes 28 and 29 to be fired. Simultaneously the triggering capacitors 35 and 40 are charged by the high D.C voltage from the rectifier circuit C. in such conditions, the operation of the flash tube member is initiated by the closing of switch 33 of the second trigger pulse generating circuit F in synchronism with the camera shutter opening operation, enabling flash tubes 17 and 19. When the switch 33 is closed, the electric charge of the trigger capacitor 35 is discharged through the switch 33 and the input winding 36a of the trigger transformer 36. By discharge of the capacitor 35, triggering pulses are generated from the output winding 36b and the detection winding 36c of the trigger transformer 36. The stored voltage on the second main storage capacitor 29 appears across the electrodes 19a and 19b of the second flash tube 19. The triggering pulse generated from the output winding 36b is applied to the trigger electrode 19c of the second flash tube 19, and thereby the second flash tube 19 is triggered. And, at the same time, the first thyristor 38 of the first trigger pulse generating circuit E is triggered and fired by a triggering signal from the detection winding 36c of the trigger transformer 36. By the firing of the first thyristor 38, the electric charge of the triggering capacitor 40 is discharged through the first thyristor 38 and the input winding 41a of the trigger transformer 41. The stored voltage on the first main storage capacitor 28 also appears across the electrodes 17a and 17b of the first flash tube 17.

The second flash tube 19 initiates a flash charge between the electrodes 19a and 19b, and, at the same time the first flash tube 17 also initiates a flash discharge between the electrodes 17a and 19b.

Under normal operation, the flash continues until the main storage capacitors 28 and 29 have discharged through the tubes 17 and 19 to the point where the voltage will no longer support the flash across the tubes 17 and 19. That usually occurs after about several milliseconds.

The quench pulse generating circuit I senses the flash lights from the tubes 17 and 19, and automatically adjusts the maximum time duration of flash remains at that time determined by the discharge of the first and the second main capacitors 28 and 29 through the first and the second flash tubes 17 and 19. The quench pulse generating circuit I supplies a triggering pulse to the triggering electrode 47c of the quench tube 47. That triggering pulse causes the quench tube 47 to become instantaneously conductive.

When the quench tube 47 becomes conductive, electric charge on the commutation capacitor 49 discharges through the quench tube 47 and the commutation resistor 46, thereby to produce across the commutation resistor 46 a voltage, such that the polarity at the cathode electrode side of the second thyristor 42, is made positive after a time interval dependent upon a time constant determined by the capacitor 49 and the resistor 46. This induced voltage across the resistor 46 causes the second thyristor 42 to turn off. When the second thyristor 42 becomes non-conductive, the first and the second flash tubes 17 and 19 are simultaneously and instantaneously extinguished, because the main current conducting electrodes 17b and 19b of flash tubes 17 and 19 are commonly connected to the anode electrode of the second thyristor 42.

In this case, since the quench tube 47 is much lower impedance, when conductive, than the first flash tube 17 and the second flash tube 19, almost all of the stored energy in the first and the second main storage capacitors 28 and 29 are discharged through the quench tube 47, causing the first flash tube 17 and the second flash tube 19 to be extinguished at a time when sufficient light has been reflected on to the photocell 15 to effect the initiation of the quenching. In this case, the flash time durations of the first tube 17 and the second flash tube 19 are same and/or the approximately same, and the flash light quantity of the second flash tube 19 is greater than that of the first flash tube 17.

Figure 3:
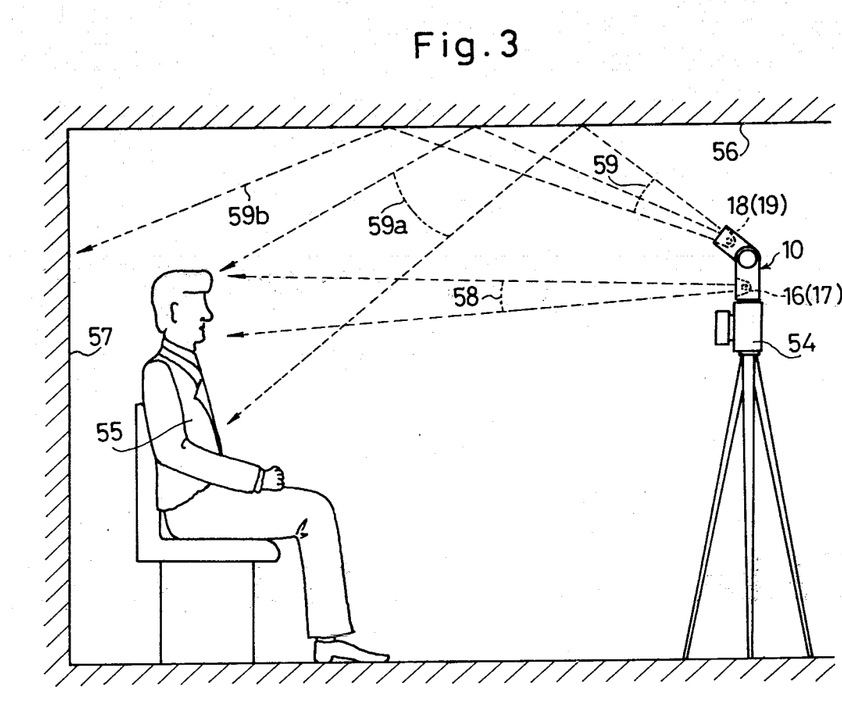
FIG. 3 is an elevational-side view explaining the operation of an electric flash device in accordance with the present invention when used in the performance of bounced-light flash photography.

FIG. 3 shows the manner in which the above described electric flash device can be used in reflected flash light photography in a room or photo-studio. The flash housing 10 is mounted on top of a camera 54. The first flash member 16 of the first casing 11 is directed toward an object to be photographed, such as a man 55. The second casing 12 is set at a suitable angular orientation with respect to the first casing 11, and the second flash member 18 is directed toward a ceiling 56, in order to apply the bounced flash light to the object to be photographed. That is to say, flash light 59 from the second flash member 18 is directed toward the surface of the ceiling 56. The flash light 59 reflects at the surface of the ceiling 56 and thereafter constitutes the bounce light. A portion 59a of the reflected light produced by reflection of the flash light 59 is incident on the man 55, and another portion 59b of the bounced light is incident on a background surface such as a wall 57 of the room. The portion 59a is superimposed with the flash light 58 from the first flash member 16, while the portion 59b of the bounced light eliminates shadow in the background of the object.

Figure 4:
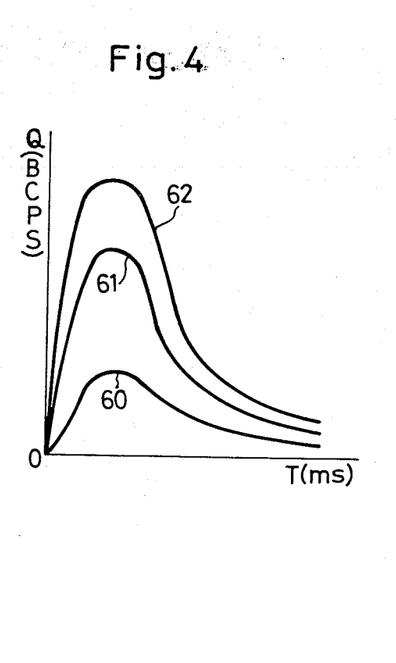
FIG. 4 is a graph showing the quantity of light produced from an electric flash device according to the present invention as measured against time.

As mentioned earlier, the quantity of flash light 59 is set to be greater than the quantity of flash light 58 produced from the first flash tube 17 by making the inner impedance of the second flash tube 19 to be higher than that of the first flash tube 17, as is best shown in FIG. 4.

FIG. 4 shows characteristics of flash light quantity Q as measured in term of Beam Candle Per Second (BCPS) with respect to Time T as measured in Millisecond (MS). In FIG. 4, a curve 60 shows the flash light characteristic of the first light tube 17, a curve 61 shows the flash light characteristic of the second flash light tube 19 and a curve 62 illustrates the characteristic of the light resulting from the combination of the flash light from the first flash tube 17 and the second flash tube 19. As is apparent from the curve 62 in FIG. 4, the total amount of the flash light produced from the flash apparatus is greater than that of a conventional flash device having only one flash member.

Figure 5:
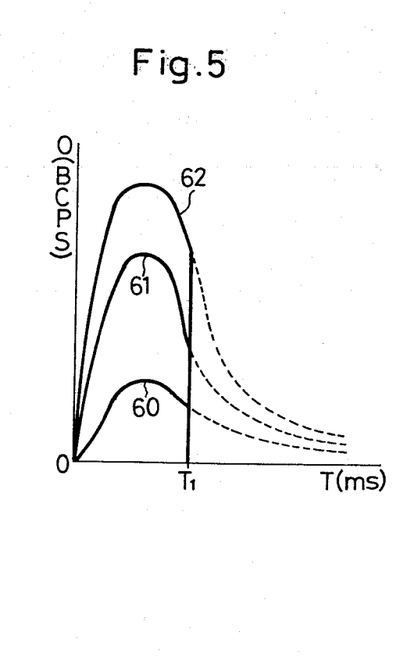
FIG. 5 is a graph showing the quantity of light and indicating the manner of operation of an electric flash device according to the present invention.

Accordingly, in the photographing mode shown in FIG. 3, the brightness of the object to be photographed such as the man 55 is increased and made uniform. The duration of the periods of emission of flash light by the first flash tube 17 and the second flash tube 19 is set at $T_1$ as is shown in FIG. 5. The time interval $T_1$ is preselected in synchronism with the shutter operation of the camera 54. The flash durations of the tubes 17 and 19 are synchronized and set at the time $T_1$, and the tubes 17 and 19 are simultaneously and/or approximately same time extinguished at the time $T_1$ as is shown in FIG. 5 thereby to avoid unnecessary operation of the tubes 17 and 19. This permits the effective use of the first and the second main storage capacitors of reduced rated capacity are made even though the apparatus is equipped with two flash tubes.

Additionally, only one of the first and the second flash tubes 17 and 19 can be activated by means of employing a selector switch (not shown in the drawing), since the flash tubes 17 and 19 is, respectively, connected to the respective first main storage capacitor 28 and the second main storage capacitor 29.

Figure 6:
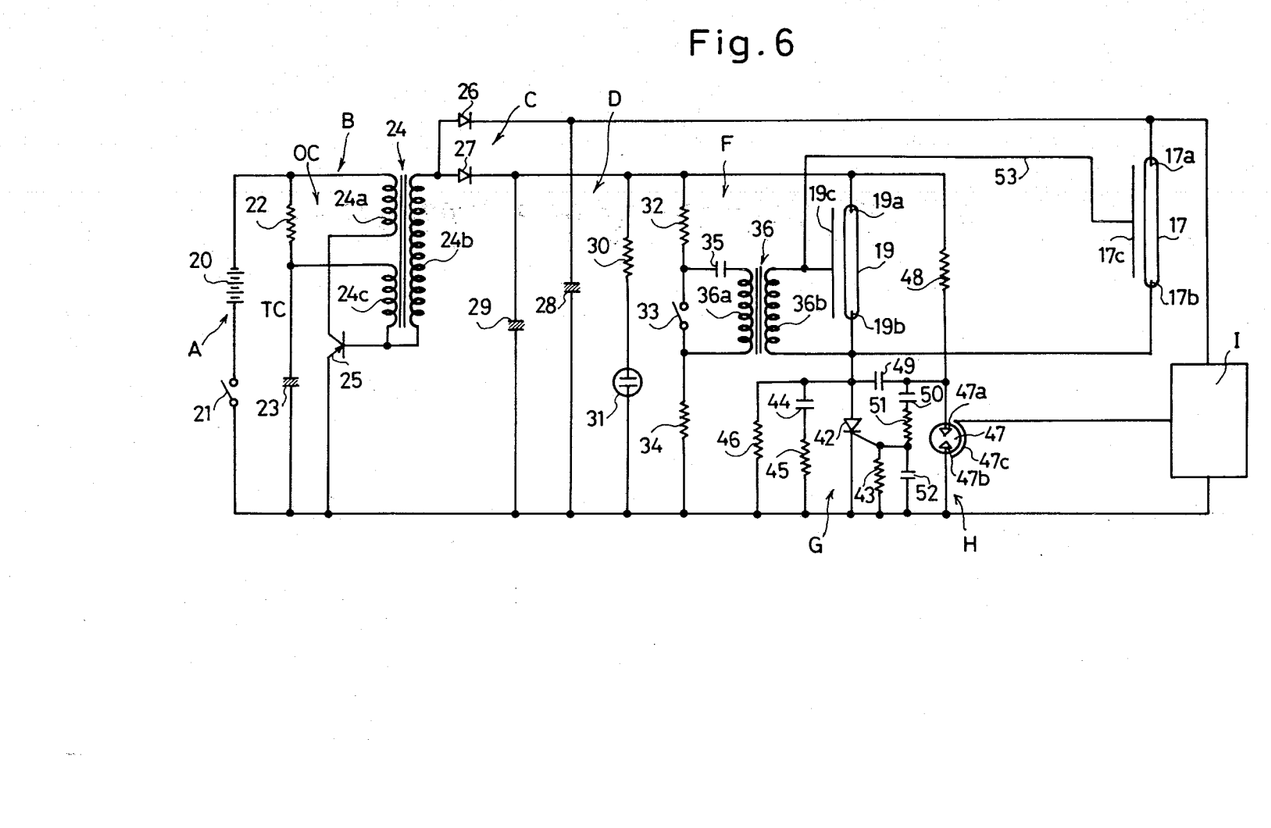
FIG. 6 is a detailed diagram of a control circuit arrangement of an electric flash device in accordance of other embodiment of the present invention.

FIG. 6 illustrates other embodiment of the flash control circuit arrangement in accordance with the present invention. The device of this embodiment comprises, also, a direct current power source circuit A, a voltage converter circuit B for converting a direct current power source circuit A to an alternating current voltage, a rectifier circuit for rectifying the alternating current voltage to the direct current voltage, an electric charge storing circuit D for supplying the electrical energy to the flash tubes 17 and 19, a trigger pulse generating means for triggering the triggering circuit member, a switching circuit G for actuating the flash tube circuit member, a quenching circuit H for extinguishing the flash tubes of the flash tube circuit member and a quench signal generating circuit I.

In the flash control circuit arrangement of FIG. 6, the trigger pulse generating means consists of only a trigger pulse generating circuit F which comprises a trigger resistor 32 connected to a cathode electrode of a second diode 27, series connected resistors 32 and 34 and a synchronous switch 33, a trigger capacitor 34 and a trigger transformer 36.

The trigger transformer 36 consists of an input winding 36a and an output winding 36b. The output winding 36b of the trigger transformer 36 is conjointly connected to a trigger electrode 17c of the first flash tube 17 by a lead 63, and a trigger electrode 19c of the second flash tube 19. Namely, the trigger electrode 17c of the first flash tube 17 is directly connected to the output winding 36b of the trigger transformer 36 together with the trigger electrode 19c of the second flash tube 19, whereby the first flash tube 17 and the second flash tube 19 are simultaneously triggered by the triggering signal from the second triggering pulse generating circuit F. An internal impedance of the second flash tube 19 is also set to be greater than that of the first flash tube 17.

In accordance with the flash light control circuit arrangement of FIG. 6, when the switch 33 is closed, the electric charge of the trigger capacitor 35 is discharged through the switch 33 and the input winding 36a of the trigger transformer 36. By discharge of the capacitor 35, a triggering pulse are generated from the output winding 36b, and thereby the first and the second flash tubes are simultaneously triggered. As explained in the foregoing, flash tubes having identified flash timing characteristics are used as the first and the second flash tubes.

The electric flash device of FIG. 6 has the advantage of operating in a well-controlled manner and of enabling numerous discharges of the flash tubes to be effected without replacing the various elements, since the triggering circuit member F is constructed by only one trigger transformer 36 and only one triggering capacitor 34.

Figure 7:
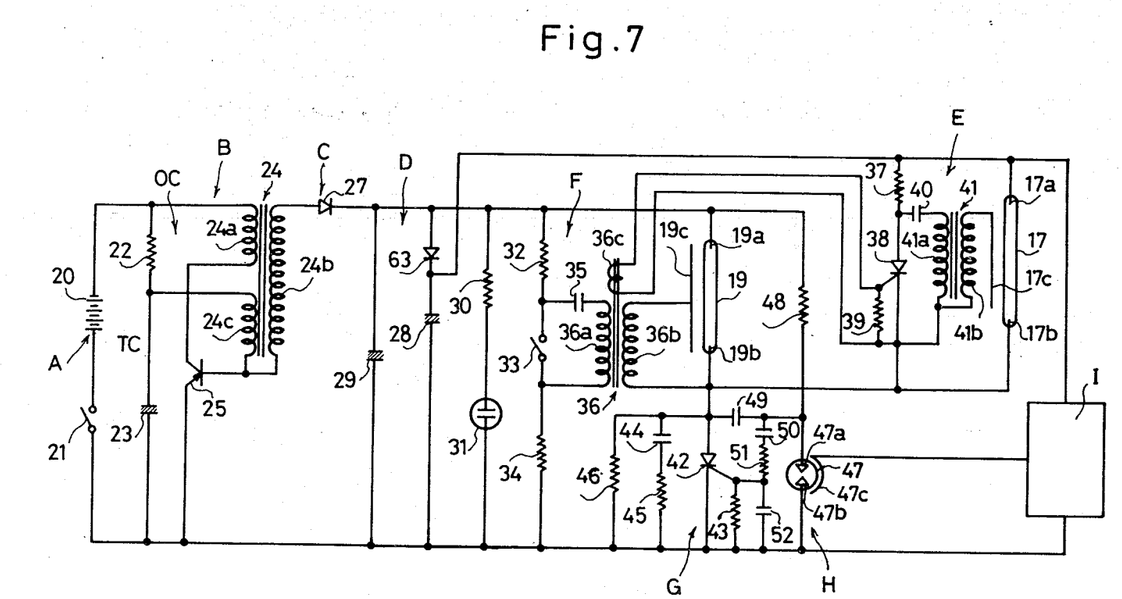
FIG. 7 is a detailed circuit diagram of a modification of the control circuit arrangement of FIG. 2.

FIG. 7 shows a modification of the flash control circuit arrangement of FIG. 2. In the arrangement of FIG. 7, a rectifier circuit C is provided with only one diode 27. An electric charge storing circuit D comprises, also, a first main storage capacitor 28 and a second main storage capacitor 29. The second main storage capacitor 29 is connected to a cathode electrode of the diode 27. The first main storage capacitor 28 is connected in parallel to the second main storage capacitor 29. Moreover, a blocking diode 63 is connected to the first main storage capacitor 28 so that a cathode electrode thereof is directed toward the first main storage capacitor 28. Accordingly, the first main storage capacitor 28 is parallelly connected to the second main storage capacitor 29 by way of the blocking diode 63. A first trigger pulse generating circuit E and a main current conducting electrode 17a are conjointly connected to a juncture of the first main storage capacitor 28 and the blocking diode 63.

Internal resistance values of the first flash tube 17 and the second flash tube 19 are adjusted and set such that flash light durations become approximately same, and capacity of the second main storage capacitor is, also, set to be greater than that of the first main storage capacitor 28.

Accordingly, the blocking diode 63 prevents current flowing from the capacitor 29 to the capacitor 28, and thereby enhanced is flashing performances of the first flash tube 17 and the second flash tube 19.

Figure 8:
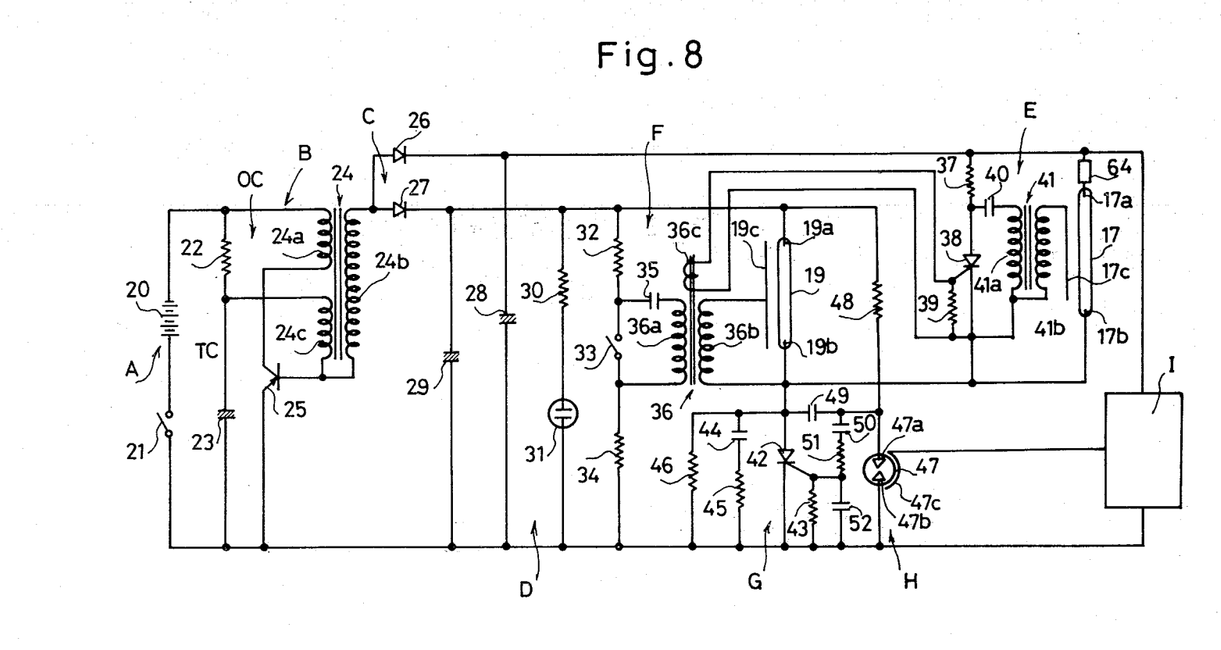
FIG. 8 is a detailed circuit diagram of further embodiment of the present invention.

FIG. 8 illustrates one possible embodiment of the present invention. In accordance with the arrangement of FIG. 8, an internal resistance value of the first flash tube 17 is set to be smaller than that of the second flash tube 19. Accordingly, an impedance element 64 is serially connected to the first flash tube 17. The impedance element 64 serves as a current-limiting element for restricting a flash current flowing in the first flash tube 17. A resistor or a chocked is may be employed as the impedance element.

In accordance with the device of FIG. 8, the current to be supplied to the first flash tube 17 must be relatively small compared with that to be supplied to the second flash tube 19, in order to make the quantity of the flash light generated by the first flash tube 17 smaller than that of the flash light from the second flash tube 19. However, when the first flash tube has a low impedance compared with the second flash tube 19, the initiation of flashing of the first flash tube 17 tends to occur earlier than that of the second flash tube 19, the impedance element 64 is connected to the first flash tube 17.

As is apparent from the above description, the electric flash device disclosed herein has the following advantages.

An advantage over the prior art flash apparatus is that the invention provides a new electric flash apparatus which the device can be made accurate in a distribution rate of the flash light quantity by providing respective main storage capacitor in each flash member.

Further advantage is that efficiency of the device is improved, since a first and a second main storage capacitors are fully employed for flashing.

Further the device can be used to perform bounce-flash photography by setting a second casing at a desired angle with respect to a first casing since the first casing and the second casing are rotatably connected together.

In view of the above, it will be seen that the several objects of the invention are achieved and other advantageous results are attained.

While a preferred embodiment of the invention has been shown and described, it will be apparent to those skilled in the art that modifications can be made without departing from the principle and spirit of the invention, the scope of which is defined in the appended claims. Accordingly, the foregoing embodiments are to be considered illustrative, rather than restricting of the invention and those modifications which come within the meaning and range of equivalency of the claims are to be included herein.

What is claimed is:

1. An electric flash apparatus comprising a first flashing member including at least one first flash tube, a second flashing member including at least one second flash tube, and a flash control arrangement having means for stopping a flash light when a resultant flash light quantity attains a predetermined value, said flash control arrangement includes an electric charge storing circuit for supplying an electrical energy to said first flash tube and said second flash tube, triggering means for triggering said first flash tube and said second flash tube, a flash tube circuit member including the first and the second flash tubes and a switching circuit for actuating said flash tube circuit member, said electric charge storing circuit comprising a first main storage capacitor for supplying an electrical energy to said first flash tube and a second main storage capacitor for supplying an electrical energy to said second flash tube, and said flash tube circuit member comprising a flash timing control means for controlling flash timing such that flash light duration of said first flash tube becomes same or approximately same with flash light duration of said second flash tube.

2. An electric flash apparatus as claimed in claim 1, wherein a capacity of said second main storage capacitor is larger than a capacity of said first main storage capacitor.

3. An electric flash apparatus as claimed in claim 1, wherein said trigger signal generating circuit having means for supplying a trigger signal to said first flash tube and said second flash tube at an approximately same time.

4. An electric flash apparatus as claimed in claim 3, wherein said trigger signal supplying means for supplying a trigger signal to said first and second flash tubes includes a trigger capacitor and a trigger transformer having an input winding connected to said trigger capacitor and an output winding electrically connected to trigger electrodes of said first and second flash tubes.

5. An electric flash device as claimed in claim 3, wherein said trigger signal supplying means comprises a first trigger circuit and a second trigger circuit, said first trigger circuit comprises a first trigger transformer having an input winding and an output winding connected to a trigger electrode of said first flash tube, a first trigger capacitor connected to said output winding and a switching element connected to said output winding of the first trigger transformer across the first trigger capacitor, and said second trigger circuit comprises a second trigger transformer having an input winding, an output winding connected to a trigger electrode of said second flash tube and a detection winding for controlling said switching element of the first trigger circuit, a second trigger capacitor and a synchronous switch connected in parallel to said input winding of the second transformer across the second trigger capacitor.

6. An electric flash apparatus as claimed in claim 5, wherein said switching element is a first thyristor.

7. An electric flash apparatus as claimed in claim 3, wherein said second flash tube is set such that a flash light quantity is relatively large, and said first flash tube is set such that a flash light quantity is set to be smaller than that of said second flash tube.

8. An electric flash apparatus as claimed in claim 1, wherein said switching circuit including a switching element conjointly connected to said first flash tube and said second flash tube.

9. An electric flash apparatus as claimed in claim 8, wherein said switching element is a second thyristor.

10. An electric flash apparatus as claimed in claim 1, further comprising a quenching circuit means for extinguishing said first and second flash tubes of the flash tube circuit member and a quench trigger signal generating circuit for actuating said quenching circuit and for supplying a quench triggering signal to the quenching circuit.

11. An electric flash apparatus as claimed in claim 10, wherein said quenching circuit comprises a quench tube connected in parallel with a series circuit of said first and second flash tubes and second switching element of the switching circuit, and a commutation circuit for turning off said second switching element.

12. An electric flash apparatus as claimed in claim 11, wherein said second switching element is a second thyristor connected in series with said first and second flash tubes.

13. An electric flash apparatus as claimed in claim 1, wherein said flash timing control means includes an impedance element for making flash time durations of the first and the second flash tubes approximately same.

14. An electric apparatus as claimed in claim 13, wherein said impedance element is connected to said first flash tube in series relationship.

15. An electric flash apparatus as claimed in claim 14, wherein said impedance element is a resistor.

16. An electric flash apparatus as claimed in claim 14, wherein said impedance element is a choked coil.

17. An electric flash apparatus as claimed in claim 1, further comprising a voltage converter circuit for converting a direct current voltage to an alternating current voltage and a rectifier circuit for rectifying said alternating current voltage to a direct current voltage.

18. An electric flash apparatus as claimed in claim 17, wherein said voltage converter circuit includes an oscillating transformer having a primary winding and a secondary winding.

19. An electric flash apparatus as claimed in claim 17, wherein said rectifier circuit having a first diode and a second diode which are connected to said secondary winding of the oscillating transformer.

20. An electric flash apparatus as claimed in claim 19, further comprising an electric charge storing circuit having a first main storage capacitor connected to said first diode and a second main storage capacitor connected to said second diode.

21. An electric flash apparatus as claimed in claim 20, wherein said electric charge storing circuit further comprising an indicating lamp for indicating a charging condition of at least one of said main storage capacitors.

22. An electric flash apparatus as claimed in claim 1, wherein said second flashing member is pivotably arranged with respect to said first flashing member.

23. An electric flash apparatus as claimed in claim 1, wherein said electric charge storing circuit comprising a first main storage capacitor and a second main storage capacitor of which capacity is greater than that of said first main storage capacitor, and blocking means for blocking a current flowing from said first main storage capacitor to said second main storage capacitor.

24. An electric flash apparatus as claimed in claim 23, further including a rectifier circuit consisting of a diode connected to said first main storage capacitor by way of said blocking means and to said second main storage capacitor.

25. An electric flash apparatus as claimed in claim 24, wherein said blocking means comprises a blocking diode of which a cathode electrode is connected to said first main storage capacitor.

* * * * *